(12) United States Patent
Pocha et al.

(10) Patent No.: US 10,061,813 B2
(45) Date of Patent: Aug. 28, 2018

(54) EDUCATIONAL QUERYING PROCESSING BASED ON DETECTED COURSE ENROLLMENT AND COURSE-RELEVANT QUERY TIME

(71) Applicant: Pearson Education, Inc., Upper Saddle River, NJ (US)

(72) Inventors: Dayasankar Saminathan Pocha, Colombo (LK); Thimira Dilina Kalindu Amaratunga, Nugegoda (LK); Saranyah Balasingam, Colombo (LK)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 884 days.

(21) Appl. No.: 14/465,297

(22) Filed: Aug. 21, 2014

(65) Prior Publication Data

US 2015/0140541 A1    May 21, 2015

Related U.S. Application Data

(63) Continuation of application No. 14/083,132, filed on Nov. 18, 2013, now Pat. No. 8,838,518.
(Continued)

(51) Int. Cl.
*G06F 17/30* (2006.01)
*G09B 7/00* (2006.01)
(Continued)

(52) U.S. Cl.
CPC .. *G06F 17/30528* (2013.01); *G06F 17/30522* (2013.01); *G06F 17/30699* (2013.01);
(Continued)

(58) Field of Classification Search
CPC ........ G09B 7/00; G06F 17/30522; G06N 5/02
See application file for complete search history.

(56) References Cited

U.S. PATENT DOCUMENTS 6,149,441 A * 11/2000 Pellegrino ................ G09B 7/02
434/118
6,561,812 B1    5/2003 Burmester et al.
(Continued)

OTHER PUBLICATIONS

Preinterview First Office Action dated Feb. 25, 2014 in U.S. Appl. No. 14/083,132; 18 pages.
(Continued)

*Primary Examiner* — Stanley K Hill
(74) *Attorney, Agent, or Firm* — Kilpatrick Stockton & Townsend LLC

(57) ABSTRACT

Techniques can construct a learner's educational context (e.g., course enrollments, subject-matter interests, and/or activity involvements) and tailor query processing using the educational context. For a given query, each concept in a set of concepts can be assigned a weight. The weight can depend on a query term in the query. For example, for a query including "North America", a "geography" concept and a "history" concept can be determined to be related to the query, and weights can be influenced accordingly. Weights can also depend on a user's educational context (e.g., such that the "geography" weight is higher when a learner is enrolled in a geography course). A query time can also be analyzed in view of schedule data (e.g., indicating when particular topics are to be studied in a course). Weights can further depend on which concepts are recently, currently or will soon be of interest based on the schedule.

18 Claims, 7 Drawing Sheets

Related U.S. Application Data

(60) Provisional application No. 61/904,904, filed on Nov. 15, 2013.

(51) Int. Cl.
*G09B 7/02* (2006.01)
*G06N 5/02* (2006.01)

(52) U.S. Cl.
CPC ......... *G06F 17/30867* (2013.01); *G09B 7/00* (2013.01); *G09B 7/02* (2013.01); *G06N 5/02* (2013.01)

(56) References Cited

U.S. PATENT DOCUMENTS

| | | | |
|---|---|---|---|
| 7,050,753 B2 * | 5/2006 | Knutson | G09B 5/00 434/322 |
| 7,260,355 B2 | 8/2007 | L'Allier et al. | |
| 7,885,913 B2 | 2/2011 | Weber et al. | |
| 7,933,906 B2 | 4/2011 | Hammond et al. | |
| 8,182,270 B2 | 5/2012 | Elzinga et al. | |
| 8,209,331 B1 | 6/2012 | Garg et al. | |
| 8,510,322 B2 | 8/2013 | Ray et al. | |
| 8,632,340 B1 | 1/2014 | Schugren et al. | |
| 8,838,518 B1 | 9/2014 | Pocha et al. | |
| 2002/0087416 A1 | 7/2002 | Knutson | |
| 2003/0039949 A1 | 2/2003 | Cappellucci et al. | |
| 2003/0049592 A1 | 3/2003 | Park | |
| 2004/0110119 A1 | 6/2004 | Riconda et al. | |
| 2011/0130172 A1 | 6/2011 | Rao | |
| 2011/0173225 A1 | 7/2011 | Stahl et al. | |
| 2012/0276516 A1 | 11/2012 | Teskey et al. | |
| 2014/0024009 A1 * | 1/2014 | Nealon | G09B 5/12 434/362 |

OTHER PUBLICATIONS

Notice of Allowance and Fees Due dated May 14, 2014 in U.S. Appl. No. 14/083,132; 22 pages.

* cited by examiner

EDUCATIONAL QUERYING PROCESSING BASED ON DETECTED COURSE ENROLLMENT AND COURSE-RELEVANT QUERY TIME

CROSS-REFERENCE TO RELATED APPLICATIONS

This application is a continuation of U.S. patent application Ser. No. 14/083,132, filed Nov. 18, 2013, which claims the benefit of U.S. Provisional Application No. 61/904,904, filed on Nov. 15, 2013. Each of these applications is hereby incorporated by reference in its entirety for all purposes.

BACKGROUND

The learning process is primarily built on viewing (e.g., reading, watching or hearing) informational and digesting it. In some contexts, this information is identified by others (e.g., a teacher). In other contexts, the presentation of the material is partly or entirely by chance circumstance. In yet other contexts, a motivated learner seeks particular knowledge and searches for relevant information.

Finding relevant information can be a difficult and frustrating task. A number of results returned for a given search is often very large, thereby precluding a learner from considering each search result. Unfortunately, many of the search results are of little to no interest to the learner, thereby causing the learner to lose time and to become frustrated.

SUMMARY

Certain embodiments of the invention process a search query from a learner in a manner that utilizes information about the learner's temporally precise educational context. In general, learners can be set out to retrieve information that is responsive to a question or pertains to a topic. To request this information, the learner can enter terms in a search query. However, a textual representation can be inadequate to reflect the precise question or the portion of the topic of interest. Further, the textual representation can fail to capture a level of base understanding of the learner, which can lead to query results of inappropriate knowledge assumptions (e.g., a result being too advanced or remedial). Embodiments of the invention, however, can utilize information that improves the ability to translate query terms to an understanding of an actual query objective. Returned search results can then be of higher relevance to the learner's information objective.

After receiving a query from a learner, each of a set of concepts can be assigned a weight based on the concepts' relationship to a term in the query, a context of the learner and/or when (relative to a schedule) the query was received. For example, a query can include a term "atlas". The term itself can be primarily associated with two concepts: "geography" or "anatomy" (e.g., each including the term "atlas" in their definition). The term itself may be more likely to relate to the "geography" concept (e.g., the likelihood being estimated from the concept definitions and/or past queries). However, a learner's context can be used to adjust this default assumption. For example, the learner can be enrolled in a "Human physiology" course, which can be associated with the "anatomy" concept. Further, a schedule of the course can indicate that a course topic for a week of a time of the query includes "neuroanatomy". Because it can be assumed that the learner is likely to preferentially seek information pertaining to his courses, the query can be predominately associated with the "anatomy" concept.

Each content item can also be associated with one or more concepts. Thus, after estimating concepts applicable for a query, content objects associated with similar concepts can be identified as being relevant to the query. In one instance, a relevance metric is determined for each of one or more content items based on concept analysis of the query and of the content item. Query results can be focused on (e.g., and/or ordered based on) this relevance (e.g., to identify content items with high relevance metrics at a top of a list).

Thus, a learner can initially face a difficulty in conveying complex mental queries into short terms. This translation can unfortunately lose details of the learner's actual query interest. By extending querying processing, however, to evaluate a context of a learner and temporal information, much of the actual interest can be effectively inferred.

Embodiments of the present invention include a method, system or computer code for using educational contexts for learners to adjust processing of search queries in a learner-specific manner. Actions can be performed that include accessing an educational-context data store that associates each learner of a set of learners with an educational unit, the educational unit being associated with a schedule. A search query entered by a learner of the set of learners can be received via an interface at an input time. The search query can include a query term. A portion of the schedule corresponding to the input time can be identified. A weight for a concept can be determined based on the query term; the association of the educational unit with the learner; and the portion of the schedule. A query result can be determined based on the determined weight, the query result identifying a content object as being responsive to the query.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In some embodiments, techniques can construct a learner's educational context (e.g., course enrollments, subject-matter interests, and/or activity involvements) and tailor query processing using the educational context. For a given query, a weight can be assigned to each of one or more concepts in a set of concepts. The weight can depend on a term in the query (e.g., and determining a semantic relationship between the term and various concepts). For example, for a query including the term "North America", a "geography" concept and a "history" concept can be determined to be related to the query based on an ontology, and weights can be influenced accordingly. Weights can also depend on a user's educational context (e.g., such that the "geography" weight is higher when a learner is enrolled in a geography course). A query time can also be analyzed in view of schedule data (e.g., indicating when particular topics are to be studied in a course or when assignments or exams focusing on particular topics are scheduled to occur). Weights can further depend on which concepts are recently, currently or will soon be of interest based on the schedule.

Figure 1:
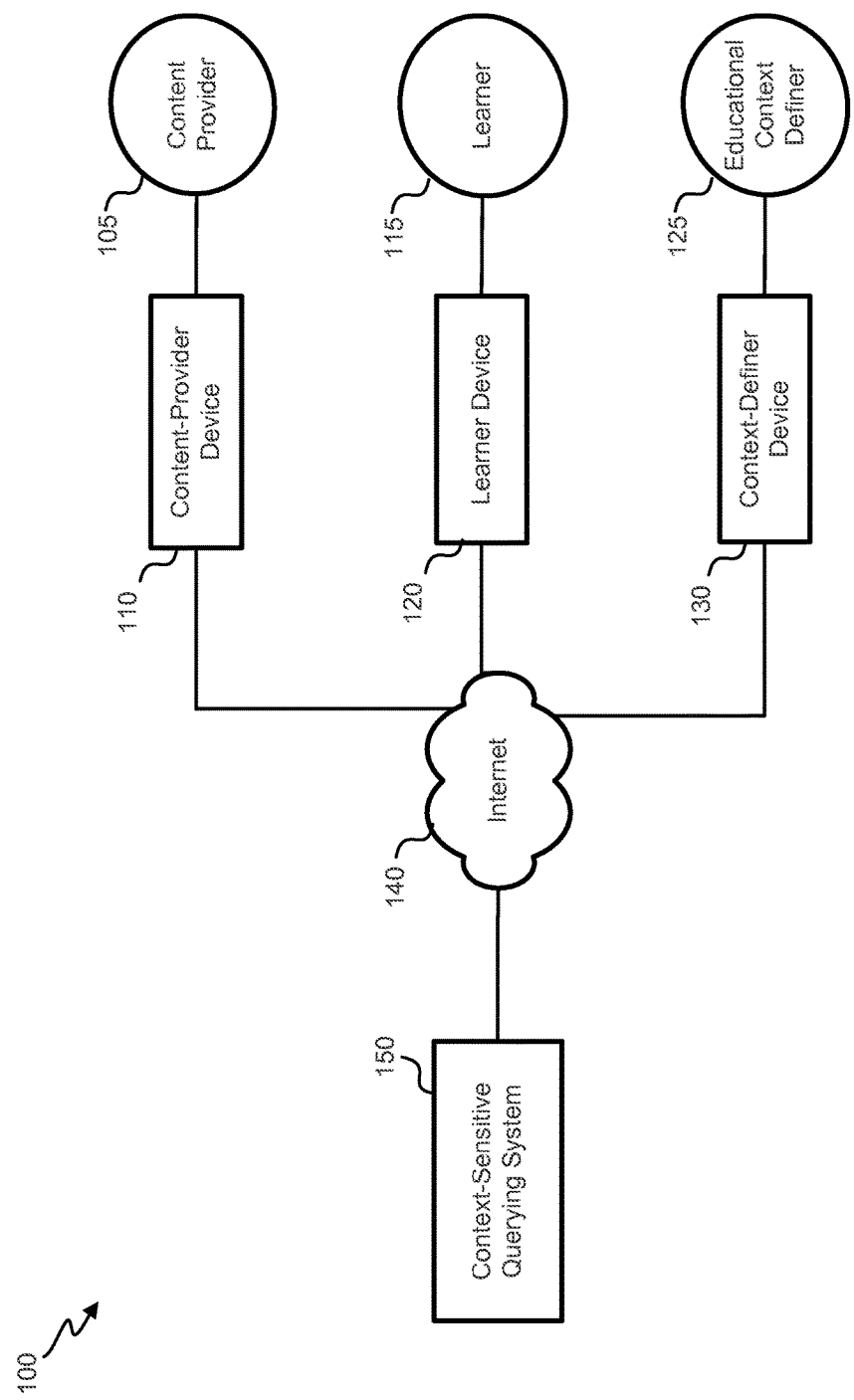
FIG. 1 depicts a block diagram of an embodiment of a context-sensitive query interaction system.

Referring first to FIG. 1, a block diagram of an embodiment of a context-sensitive query interaction system 100 is shown. A content provider 105, learner 115 and/or educational context definer 125 can interact with a context-sensitive querying system 150 via respective devices 110, 120 and/or 130 and a network, such as the Internet 140 or a wide area network (WAN), local area network (LAN) or other backbone. In some embodiments, context-sensitive querying system 150 is made available to one or more of content provider 105, learner 115 and/or context definer 125 via an app (that can be downloaded to and executed on a portable electronic device) or a website. It will be understood that, although only one content provider 105, learner 115 and/or context definer 125 are shown, system 100 can include content providers 105, learners 115 and/or context definers 125.

Content-provider device 110, learner device 120 and/or context-definer device 130 can each be a single electronic device, such as a hand-held electronic device (e.g., a smartphone). It will be understood that content-provider device 110, learner device 120 and/or context-definer device 130 can also include a system that includes multiple devices and/or components. The device(s) 110, 120 and/or 130 can comprise a computer, such as the desktop computer, a laptop computer or a tablet. In some instances, a party 105, 115 and/or 125 uses different devices at different times to interact with the context-sensitive querying system 150. For example, learner 115 can use a desktop computer initially to enter a first query and can later use a tablet to enter a second query.

A content provider 105 can provide one or more content objects that can be made accessible to one or more learners 115. In one instance, a content library can include a set of content objects provided by one or more content providers 105. In one instance, a content library additionally or alternatively can include a set of metadata (each metadata element characterizing an associated content object), which can be provided by a content provider 105 and/or automatically generated based on provided content objects. As described in greater detail herein, context-sensitive query system 150 can, in response to a query from a learner 115, select a subset of content objects represented in the library and identify the subset to learner 115.

The content objects can include documents (e.g., articles, worksheets, or tutorials), presentations webpages and/or media files (e.g., videos, graphics or audio files). The content objects can be static or interactive, such that information presentations change based on a learner's input. For example, an interactive content object can include a quiz where a difficulty of each question depends on whether a previous response was correct. As another example, an interactive learning module can determine which information to display based on which option was selected (e.g., clicked on) by a learner. Each content object can include text and/or can be associated with one or more keywords (e.g., as specified by a content provider 105).

In some instances, content provider 105 provides metadata associated with a content object, where the metadata includes characteristics of an associated content object and can include, e.g., one or more keyword, a brief summary, a title, an author, an author affiliation (e.g., a school), an access permission (e.g., defining which learners can access the object), a difficulty level and/or a type of content. The metadata can further or alternatively include identification of a course, one or more users, a lecture, a blog and/or a concept.

Context-sensitive query system 150 (or another system) can associate each content object with one or more concepts. The concepts can be identified based on a content object's text, title, short description and/or keyword list. In some instances, the concepts are selected from amongst a concept list. Each concept association can be weighted based on, e.g., a number of times that the one or more words occurs. For example, for a concept of "current United States government", a weight can depend on how many times each of the following words occurred in text of a content object: United States, America, government, Congress, President, 2013, House of Representatives, Senate, judiciary, branches and democracy. Concept associations (e.g., and weights) can be stored in a central library and/or in a content object's metadata.

Content objects (and/or associated metadata) can be provided such one or more objects can be identified to and/or accessed by learners. In some instances, a content provider 105 can upload content objects (and/or associated metadata) to a library maintained by context-sensitive querying system 150. In other instances, a separate system receives uploaded data and manages the library, while context-sensitive query system 150 can access the library. In some instances, a library can be distributed, e.g., with individual content objects residing on various content-provider devices. A corresponding metadata library can be centrally located to facilitate searching.

A learner 115 can enter a search query which can include a term indicative of a property of a content object of interest. Learner 115 can be, e.g., a student (e.g., in a school), an activity participant and/or a user of an online search system.

Context-sensitive querying system 150 can search a library (e.g., of content objects, of content objects' metadata and/or of content objects' term associations) to identify content objects to return in response to the query.

A query result can depend on three factors: a term in the query, a context of the learner and/or a time of the query. In one instance, each of these factors can be used to determine a concept that the learner is attempting to research via the query. Initially, a set of concepts can be accessed. Weights can be assigned to individual concepts in the list based on how related the concept is to a query term, how related the concept is to an educational context for a learner entering the query and/or how temporally close a time point for the concept is (e.g., in a timeline for a context for the learner) to a time of the query.

Base relationships between a query term and concepts can be determined based on, e.g., ontologies and/or definitions of the concepts (e.g., that associate the concept with particular terms). To assign a weight to concepts based on a learner's context, both the context and a mapping between the context and concepts can be determined.

A context definer 125 can enter information that at least partly identifies a context that may be experienced by a learner and/or concepts pertaining to the context. Context definer 125 can be, e.g., a learner 115, a school administrator, or an instructor. In some instances, context information is automatically generated (e.g., to reflect one or more course enrollments or past learner queries), which may (or may not) be generated based on a person's input (e.g., a learner's selection of a course, an administrator's acceptance of a course selection, a learner's input of a query). Context-defining information can include an association between a learner and a particular context (e.g., indicating that a learner is enrolled in a Geometry course, is involved in a student-government activity or is interested in ecology). Context-defining information can alternatively or additionally associate a user with a context such as a grade level (e.g., sixth grade or high school freshman), a knowledge base as estimated based on a previously received grade (e.g., in a previous course or past assignment or test) or a school.

In some instances, context-defining information includes information about a particular context, such as information about one or more courses in which a learner is enrolled. The information can include, e.g., as a syllabus of a course, a text-book of a course, an enrollee or participant list and/or an instructor or coordinator. One or more concepts can be associated with a particular course based on automated analysis of course-associated information (e.g., based on terms in a syllabus) or based on input provided from a context definer 125. For example, a course syllabus can assessed to extract terms associated with the following concepts: "triangle types", "triangle area", "Pythagorean Theorem" and "ratios". As another example, input from a context provider 125 that identifies a student-government activity can indicate that it is to be associated with the following concepts: "election", "popular vote", "campaigning" and "representation". As yet another example, for a given course, terms associated with content objects accessed by course enrollees can then be associated with the course.

Context-sensitive querying system 150 can thus, upon receiving a query with a term from a learner 115, identify one or more contexts of the learner 115 based on context information and can further identify concepts associated with contexts. Weights of these concepts can then be increased, as it can be assumed that a learner may be interested in context-relevant concepts.

To further utilize educational-context information, context-sensitive querying system 150 can utilize temporal information. Many educational contexts can progress along a timeline. The timeline can identify, e.g., time periods during which particular subjects are to be studied, due dates of assignments, exam dates, activity dates (e.g., dates of an election, meet, or speech), and/or holiday dates (e.g., when school is not in session). A query time can be assessed relative to the timeline, and concept weights can be set based on temporally close timeline events. For example, a query time can be mapped to a timeline of a syllabus, and weights of one or more concepts near (e.g., temporally near) the mapped syllabus point (e.g., a subject being studied) can be increased.

Figure 2:
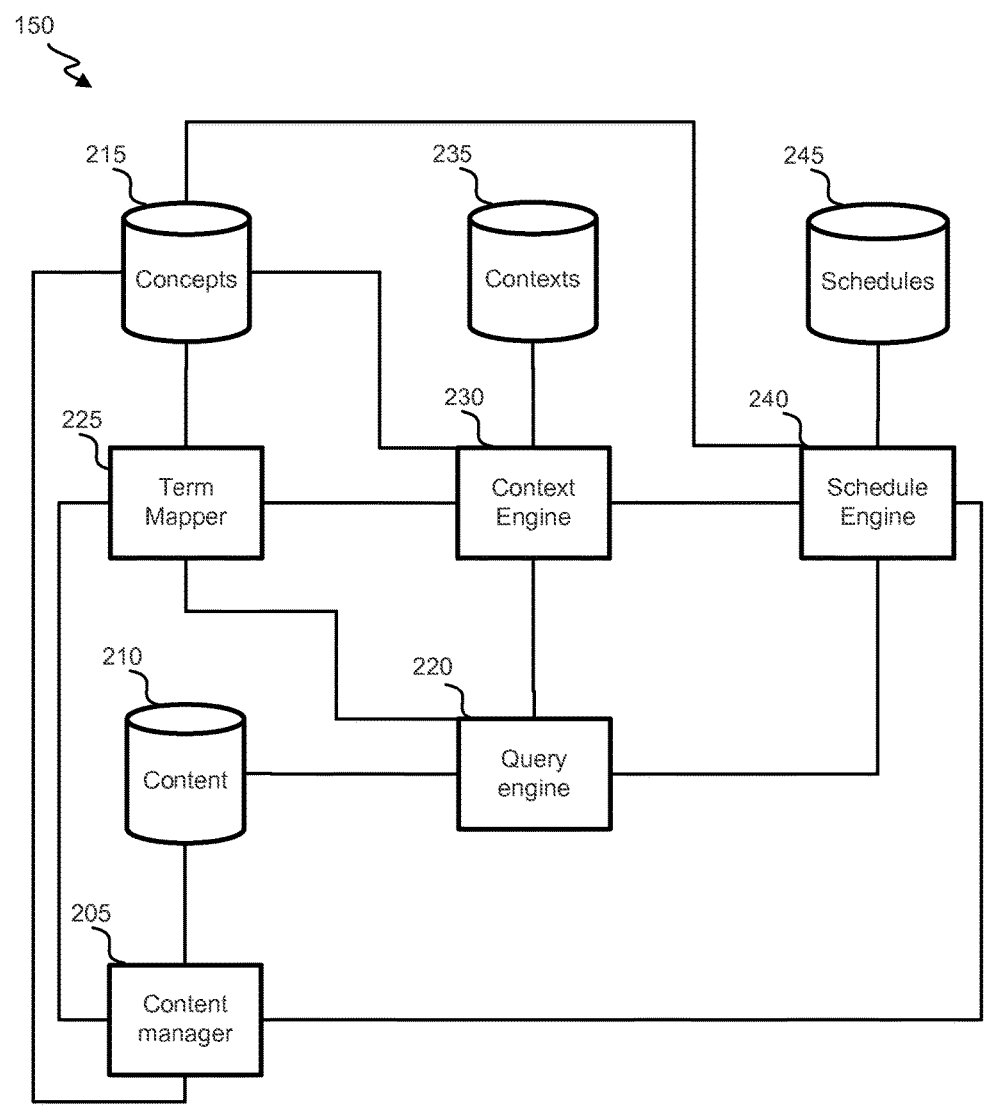
FIG. 2 depicts a block diagram of an embodiment of context-sensitive query system.

Referring next to FIG. 2, a block diagram of an embodiment of context-sensitive query system 150 is shown. Context-sensitive query system 150 can be, in part or in its entirety, in a cloud. In some instances, at least part of context-sensitive query system 150 is present on a device, such as a learner device 120. Context-sensitive query system 150 can include be distributed across devices, such as learner device 120 and a cloud device.

Context-sensitive query system 150 can include a content manager 205 that can receive, process, store and/or retrieve content objects. For example, a content provider 105 can upload a content object via a website provided by content manager 205. Metadata for the content object can alternatively or additionally be uploaded or otherwise identified (e.g., based on manual entry into fields in a webpage). Content manager 205 can store the content objects and/or metadata in a content data store 210. In some instances, content manager 205 can itself generate metadata for a content object (e.g., identifying a source or upload time).

Metadata for a content object can include information such as an object's title, keyword list, short summary, object type, difficulty level, accessibility restriction, author and/or language. Alternatively or additionally, metadata can include one or more concepts tied to the object. The concepts can be identified based on input from a content provider 105 (e.g., a selection from amongst available concepts during upload of an object) or automatically. For example, content manager can analyze a content object's text, title, keywords, and/or summary to identify concepts for the object.

Content manager 205 can access a concepts data store 215 that can identify a set of available concepts and defining information for each concept. For example, for a concept of "proper book citation", concepts data store 215 can indicate that the concept is associated with terms such as MLA style, ABA format, reference, format, and cite. Presence of these terms in a content object or in its metadata can suggest that it relates to the concept.

In some instances, determining whether a content object relates to a particular concept is binary and/or based on a threshold analysis (e.g., does a title include a concept-associated term or do more than a threshold fraction of terms in text of an object match a concept-associated term). In some instances, the determination includes determining a weight for each of multiple concepts (e.g., or for each available concept). The weight can be based on factors such as relative or absolute concept-associated term frequencies and location of concept-associated terms (e.g., title versus keyword versus text). The concept associations can alternatively or further be based on other associations for the content object. For example, a course structure (e.g., syllabus) can reference a given content object (e.g., generally or for a given portion of the course). The object can then be associated with concepts associated with the course. It will be appreciated that, as used herein, association of a concept with, e.g., a content object, query term, context or event can include a binary association (e.g., the concept is included in a list of select associated concepts) and/or a continuous association (e.g., such that a weight of an "associated" concept is increased as a result of the association).

Context-sensitive query engine 150 can include a query engine 220 that can receive a query from a learner 115. The query can include a query term, which can include one or more words. Query engine 220 can use a combination of analyses to attempt to derive a concept of interest to the learner.

The query term itself can serve as one indicator of a concept of interest. A concept term mapper 225 can process a query to extract a query term and to identify one or more concepts generally associated with the term. Thus, this analysis can be performed without learner-specific assessments and can include (for example) semantic analysis, ontology analysis, and/or use of concept definitions. For example, concept term mapper 225 can extract various combinations of words from a query (e.g., excluding articles) and can then determine whether any concept definition includes the word(s). For a given query, concept term mapper 225 can determine a weight to each of one, more or all concepts.

A context engine 230 can further influence query processing. Context engine 230 can manage a context data store 235, which can include information pertaining to various contexts. The contexts can include educational and/or non-education contexts. The contexts can include, e.g., a course, a major, a school, a grade level, a knowledge base (e.g., as approximated based on a past course, exam or assignment grade), an activity (e.g., a school team or club) and/or an interest (e.g., a subject matter of interest). Each of one or more contexts can include details such as: an affiliated teacher, professor, organizer or leader; an affiliated school, institution or organization; one or more subject matters pertaining to the context; a difficulty and/or grade level; a pre-requisite; and/or one or more content objects (e.g., a text book). In some instances, each of one or more contexts includes a list of learners associated with the context (e.g., a list of enrollees or participants) or a time associated with the context (e.g., a start date, an end date, and/or a meeting day and time).

A context can be defined based on input from an educational-context definer 125, who can include (for example) a person who created or organized the context (e.g., created a course) and/or who is leading the context (e.g., a professor). A context can be modified to include additional information based on input from another educational-context definer 125, such as an administrator or learner 105. Thus, for example, an instructor can use an app to enter a name, time, summary and topics for a new course. Context engine 230 can infer that the instructor will be the instructor for the course and can associate the course with the instructor, a school and a grade level based on data stored about the instructor. Subsequently, each of a set of learners can use a website to enroll in the course, and information for the context can be automatically updated to reflect their enrollment.

Context engine 230 can associate each context with one or more concepts. The association can be automatically performed or performed based on input from an educational-context definer 125. For example, an educational-context definer 125 can select from amongst concepts while creating a context. As another example, context engine 230 can determine whether and how many terms associated with various concepts are present in information defining a context. As yet another example, context engine 230 can analyze a content object that is associated with the context (e.g., concepts of a context can include one or more concepts of a textbook for the context). As yet another example, context engine 230 can identify concepts associated with past queries of other learners in a same context. To illustrate, a learner can be in a psychology course with 20 other learners. Context engine 230 can identify one or more concepts associated with a query terms entered by one or more of the other learners and/or past content objects accessed by the learners and can infer that the learner is likely to be interested in similar concepts.

In additional to general context-defining information, an educational-context definer 125 can provide temporally specific information. For example, an agenda, syllabus, timeline, event timeline or other schedule can be provided. A schedule engine 240 can store the schedule in a schedule data store 245. The schedule can include a series of events, which can include classes (or other meetings), focuses on various subject matters, exams, assignments, or competitions. Each event can be associated with an absolute time (e.g., November 17 class: Punnett squares) or relative time (e.g., Class 4: gene mutation).

Schedule engine 240 can ensure that each event is associated with a concept. In instances in which the association is not already present, it can be determined by analyzing text associated with the event. The text can include text defining the event in the schedule (e.g., a focus of an exam or class-discussion subjects preceding an exam) or text referred to in the schedule before or for the event (e.g., pages of a textbook in an assignment before a quiz). The text can then be analyzed using concept definitions, as described herein. The concept association can further utilization information applicable to the context in general. For example, a Week 10 subject can include conjugation, and a concept can be defined as "Spanish conjugation" given that a course is a Spanish course.

Query engine 220 can then identify a query-responsive concept based on concepts associated with a query term, a learner's context and a portion of a context's schedule associated with a query time. In one instance, each of one or more concepts is associated with a weight, and the weight is influenced by the query term, context and query time. For example, a first, second and third weight component can be assigned to each concept based on a query term, context and query time (respectively). As another example, the weight can be repeatedly adjusted: it can initially be set based on the query term, can thereafter be adjusted based on the context and can be subsequently adjusted based on the query time and schedule. In one instance, one or more of the factors restricts the possible concepts. For example, a query term can be used to identify a subset of potential concepts (e.g., each of which can be associated with an initial weight), and the weight of each (or a further subset selection) can be determined based on a context and/or schedule.

In one instance, query engine 220 can use concepts associated with a query term, context and/or query time to refine a concept map built by content manager 205. Content manager 205 can build an initial concept map that connects various concepts via weighted or unweighted connections. The connections (e.g., and their strength) can be determined by determining which concepts are likely to be associated with individual content items. Thus, for example, a connection may be formed between "music" and "piano" after determining that one or more (e.g., exceeding a threshold) content objects include both of these terms. A strength of the connection can depend on a number or fraction of objects associated with both concepts.

Concept term mapper 225 can identify one or more query-, context- and/or time-associated concepts in the map and assign a high weight to those concepts. Weights of other concepts related to the query-, context- and/or time-associated concepts can also be defined (e.g., based on how many connections separate the other concept from a query-, context- and/or time-associated concept and/or a strength of one, more or each connection separating the other concept from a query-associated concept).

Query engine 220 can then use the concepts to identify a query result. Specifically, query engine 220 can define relevant content objects as those associated with concepts identified for a query term. For example, for each content object, a weight can be assigned to each concept to thereby reflect an extent to which the object relates to the concept. Similarly, for each query term, a weight can be assigned (e.g., based on the term, context and query time) to each concept to similarly reflect an extent to which the query relates to the concept. A relevance metric can be defined to be—for each content object—a dot product of these weights.

One, or a number, of concepts can be identified as primary concepts for a query. This identification can be performed by identify concepts with an above-threshold absolute or relative weight (e.g., relative to other concepts' weights for the content object). Relevant content objects can be identified as those with the strongest associations (with the primary concepts (e.g., with the highest weights for that concept amongst a set of content objects for those concepts).

Query engine 220 can use the relevance metric to influence query results. For example, the results can be restricted to content objects with a relevance threshold above an absolute or relative threshold (e.g., having a metric amongst the top 100 within a set of content objects), or an order of the results can be based on the relevance metrics (e.g., identifying content metrics with high relevance metrics first).

In one instance, a query result includes a list of identifiers of content objects. An identifier can include a title, one or more keywords, a short summary, a portion of content and/or a source. A learner can then click on an identifier to access the content object (such that the object is then retrieved from content data store 210 or another content source). In one instance, a query result includes a content object. For example, a learner may be automatically directed to a content object with a highest relevance metric.

Figure 3:
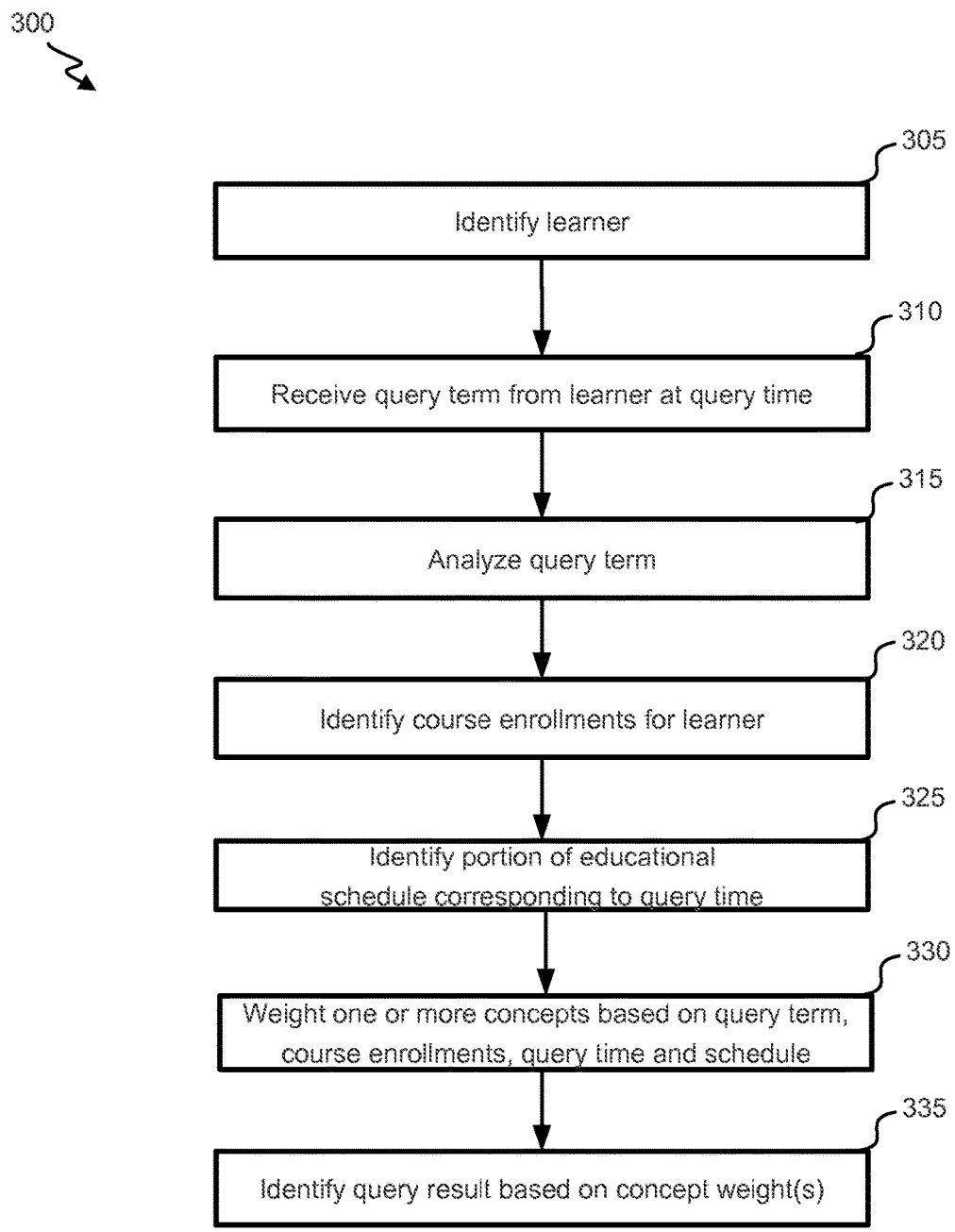
FIG. 3 illustrates a flowchart of an embodiment of a process for using educational context information and a query time to identify relevant content objects responsive to a query.

FIG. 3 illustrates a flowchart of an embodiment of a process 300 for using educational context information and a query time to identify relevant content objects responsive to a query. Process 300 begins at block 305 where query engine identifies a learner. The identification can be performed, e.g., based on login information (e.g., a username and password) provided by the learner (e.g., the login being provided to log into an operating-system account, an email account, a search account, or a context account, such as a school or course account) or by a device (e.g., a computer or mobile device) being used by the learner.

At block 310, query engine 220 receives a query that includes a query term from a learner at a query time. The query can be received via an interface, such as a web interface or app interface. In addition to the query term, in some instances, one or more restrictions (e.g., search focuses) can be received from the learner or another party (e.g., a teacher or administrator). Available focuses can correspond to current contexts for the user. For example, query engine 220 can identify one, more or each course that the learner is enrolled in, activity that the learner is participating in and/or a general option. The user can then select a context focus and proceed to enter a query term in a text box.

Query engine 220 can identify a query term from the query by, e.g., scanning the query for any term that is included in a term database. In some instances, only a subset of the terms in the term database are concept terms, which are (or can be) directly associated with one or more concepts. Remaining terms can be mapped to concept terms. For example, a term "USA" can be mapped to a concept term "United States", which can be referenced in one or more concept definitions. The concept term can then serve as the query term for subsequent analysis.

Concept term mapper 225 analyzes the query term at block 315. The analysis can include mapping the term to one or more concepts (e.g., by identifying which concepts include the term or a corresponding term in their definitions). Thus, in one instance, the analysis includes selecting a subset of concepts from amongst a set of concepts that relate to the query term. The selection can be based on a concept's definition, such that (for example) the definition for each concept in the subset includes the query term.

The analysis can also or alternatively include determining a term-correspondence variable for each of one or more concepts. The variable can be based on a relationship factor in a concept's definition. For example, a concept's definition can identify a relationship factor for each of a set of terms (e.g., a definition for an "Accounting" concept can include relationship factors of 0.6, 0.1 and 0 for terms taxes, spreadsheet and literature). Thus, for a query term of "taxes" (or another query term determined by concept term mapper 225 to correspond to "taxes"), a term-correspondence variable for "Accounting" can be set to 0.6. In instances where the analysis includes a selection of a subset of concepts, the subset can be selected by comparing relationship factors to a threshold.

To illustrate, a query can include "Georges Washington." Query engine 220 can first map the initial query term "George Washington" (e.g., based on a closest-neighbor textual analysis). Concept definitions can then be scanned and 25 of 1000 concepts (e.g., history, United States, presidents, revolutionary war) can be identified due to an inclusion of "George Washington" in their definitions. A term-correspondence factor can then be determined for each concept based on a relationship factor in the concept's definition for the term.

In one instance, an initial concept map is built using content objects to identify relationships between concepts. Based on a query, the concept map can be tailored to assign weights to one or more of the concepts in the map based on their relationship to a query term and/or the map's interconnectivity between concepts. Initially, a query can be associated with one or more concepts. These associations can be formed based on analysis of terms in content objects (e.g., to identify particular terms as corresponding to one or more concepts). After forming these associations, weights of concepts in a concept map can be adjusted. For example, an initial concept map can connect each concept in the map to one or more other concepts via weighted or unweighted connections. Concepts in the concept map associated with a query term can be identified and heavily weighted. Other concepts connected to the query-associated concepts can also be preferentially weighted (e.g., though—in some instances—not as highly as the query-associated concepts). The weight of these other concepts can depend on a weight of a connection in the concept map between the query-associated concept and the other concept.

At block 320, context engine 230 identifies one or more contexts for the learner. The context can include an educational context, such as a course that the learner is enrolled in. The context can be determined using information about the learner present in an account for the learner. For example, the learner can log into an account before submitting a query (or after, but prior to processing of the query). Account data can include scholastic information, such as current courses (e.g., and current grades), past courses (e.g., and grades), enrollments in future courses, activity participation, etc.

The information can include information that was provided by the learner or by another party (e.g., a school administrator). In some instances, the information can include course selections provided by the learner to enroll in the course and/or information provided by an administrator responsive to the selections to indicate actual enrollments.

It will be appreciated that multiple contexts can be identified at block 320. One context can itself be indicative of other contexts. For example, if a learner is enrolled in "Chemistry 397", information about that course could also indicate that other contexts are "Professor Smith", "high school senior", "math knowledge level: algebra completed", "Example University", and "Classmates X, Y and Z".

In some instances, a context can be defined based on a rule. For example, a local or remote rule can indicate that a "Computer science" context is to be applied for all devices within a geographical area (e.g., a computer lab) during a time period (e.g., a course time). In this way, for example, an instructor may be able to focus searching and/or restrict tangential searching.

Each context can be associated with one or more concepts. In one instance, a definition of a context specifies the concepts. For example, if an administrator or instructor is adding a course, context engine 230 can display a list of contexts and receive one or more selections. The course can then be associated with those contexts. In one (additional or alternate) instance, the one or more concepts are automatically determined by analyzing, e.g., a title, description, reference (e.g., identified text book) or other context-defining information. For example, context engine 230 can map terms from a text book's title and table of contents to concepts (e.g., using terms in concepts' definitions).

In one instance, a context is indicative of one or more classmates of a learner entering a query. Previous queries and responses to query results can then be used to determined concepts to associate with the context (identifying the classmates). For example, if 95% of classmates clicked on a content object related to a "Civil War" concept in the last week, the classmate concept can be associated with the civil war. As another example, if 95% of classmates entered a query term related to a "discrimination" concept in the last week, the classmate concept can be associated with discrimination.

For a given concept and context, a context-correspondence variable can identify a degree to which the concept is relevant for the context. For example, for a "computer-science course" context, context-correspondence variables for programming, computer architecture and webpage-design concepts can be 0.8, 0.5 and 0.1, respectively. The context-correspondence variable can be based on, e.g., input provided by a context definer, based on how the concept is determined (e.g., from a context's title versus from a context description) and/or how prominent the concept is within a context definition (e.g., how many times a term for the concept is present within a definition for the context).

At block 325, schedule engine 240 identifies a portion of a schedule that corresponds to the query time. The schedule can be associated with a context. The schedule can include, e.g., a syllabus, an exam schedule, an assignment schedule, an event schedule (e.g., for meets, matches or games), a meeting schedule, or a holiday schedule (e.g., indicating when school is in session). The schedule can include absolute or relative time points (which can include time periods). For example, a schedule can include a relative time period of "Week 1: Force" or an absolute time period of "12/1, 12/3 and 12/5: Entropy".

The query time can be mapped to a point of the schedule using the schedule's time points (e.g., and a known start date for a context of a schedule). The portion of the schedule corresponding to the query time can include a time point before the mapped query time (e.g., the two weeks before the query time or the time from the last exam to the mapped query time), the mapped query time and/or a time point after the mapped query time. Using the prior time point can allow previously taught subject matter to be reinforced through query results or can aid in a learner in preparing for an exam. Using the current time point can provide results to assist a learner in a current understanding or to digest new information. Using the near-future time point can allow results to introduce concepts soon to be studied.

A functional or absolute time window can be used to indicate how much of the schedule to include in the portion. For example, a time window can be set to 1 week or 3 classes. The window can serve as a step function or another filter. For example, a Gaussian filter can indicate that concepts associated with a time point of the schedule mapped to the query time are to predominate, while concepts slightly before or after the mapped query time are to still be recognized but have lesser influence.

Each time period in a schedule can be associated with one or more particular concepts, such that one or more concepts associated with the portion of the schedule can be identified. For example, schedule engine 240 can analyze terms associated with the time period in the schedule or in other objects (e.g., textbooks, webpages or modules) referenced in the schedule. The analysis can include mapping such terms to concept-defining terms and identifying concepts with definitions including the concept-defining terms.

For example, an astronomy syllabus can include "Week 4: Astrobiology". Schedule engine 240 can identify "astrobiology" as a concept-defining term and can locate the term in definitions of the following concepts: astrobiology, astronomy and aliens. As another example, the schedule can indicate that a reading assignment for October 5 is pages 105-115 of Textbook A. Schedule engine 240 can access information about Textbook A (e.g., a table of contents) or Textbook A itself, identifying one or more terms based on the accessed material and identify one or more concepts using the identified terms.

In one instance, system 150 can provide an interface through which an educational context definer 125 can define a schedule. For example, the interface can prompt definer 125 to define a time period for the context (e.g., a start date, an end date and/or a duration), increments of the context (e.g., individual weeks, individual course meeting dates) and subjects or assignments for each increment (e.g., entered as text or selecting from amongst a set of terms). Such an interface can even aid in identifying concepts to associate with the context.

Concepts associated with the portion of the schedule can be used to refine a concept list (e.g., all concepts, a set of concepts that relate to the query term and/or a set of concepts that relate to a context) and/or to determine a schedule-correspondence variable for each of one or more concepts.

The variable can be based on how strongly the concept relates to the portion of the schedule. For example, for a "Mouse" concept, a schedule element of "Mice" can be more strongly related to the concept than "Medicine development" with lists "mouse model" as a subsidiary topic. The variable can also be based on temporal aspects, such that (for example) concepts tied to a point in the schedule mapped to the query time can be more influential than concepts tied to more temporally remote points the schedule.

In one instance, evaluations of contexts and schedules can be integrated. For example, if each week of a 12-week course associated with a different concept, a correspond variable can indicate that each of the twelve concepts have a base correspondence level for a user. For a query made during week 4 of the course, the correspondence level for concepts temporally near a query time (e.g., those for weeks 3-5) can be enhanced. This process can be equivalent to applying a temporal filter with a y-axis offset.

Query engine 220 assigns a weight to each of one or more concepts. The weight can represent an estimated relevance of the concept to the query. The weight for a given concept can depend on a query term, a context of a learner entering the query, a time that the query was entered and/or a schedule of a context of the learner. For example, the weight can depend on a term-correspondence variable, a context-correspondence variable and/or a schedule-correspondence variable for that concept. In some instances, the weight assignments amounts to a selection of a subset of concepts estimated to relate to the query. For example, one or more weights can be set to zero, indicating that they are estimated not to apply to a query. As another example, one or more weights can be set to a number below a relevance threshold.

In one instance, weight assignments depend on an iterative analysis of the query term, a learner's context and a query time. For example, initial concept weights can be defined as corresponding term-correspondence variables. Concepts related to an identified context can then be used to adjust the initial weights. Similarly, concepts related to a query time (e.g., via a schedule) can further or alternatively be used to adjust the weights.

Query engine 220 identifies a query result based on the weight(s) assigned to the one or more concepts at block 335. The query result can include an identification of one or more content objects. The query result can be identified based on concepts' assigned weights and concepts associated with content items. For example, a relevance score can be generated for each of one or more content items, where the score depends on whether (and/or an extent to which) the content object relate to a concept and whether (and/or an extent to which) the query relates to a concept. Thus, the relevance score can depend on a product of a content object's weight for the concept and the query's weight for the concept.

It will be appreciated that, in some instances, a single concept can be identified as a primary concept for the query (e.g., the identification being based on query-term analysis, context analysis, query-time analysis, etc.). Relevance scores for content objects can then be scored based on their tie to the primary concept.

In other instances, multiple concepts can be considered. Thus, the relevance score can further depend on the similarities in relationships for these concepts. For example, the relevance score can be generated using a dot-product of a vector of a content object's weights for a set (or subset) of concepts and a vector of a query's weights for the set (or subset) of concepts.

Relevance scores can be used to determine presentation decisions, such as which content objects are to be identified to a learner or how identifications of content objects are to be ordered. For example, only content items with a relevance score over a threshold can be identified, or content objects can be ranked according to their relevance scores and then identified in the ranked order.

Figure 4:
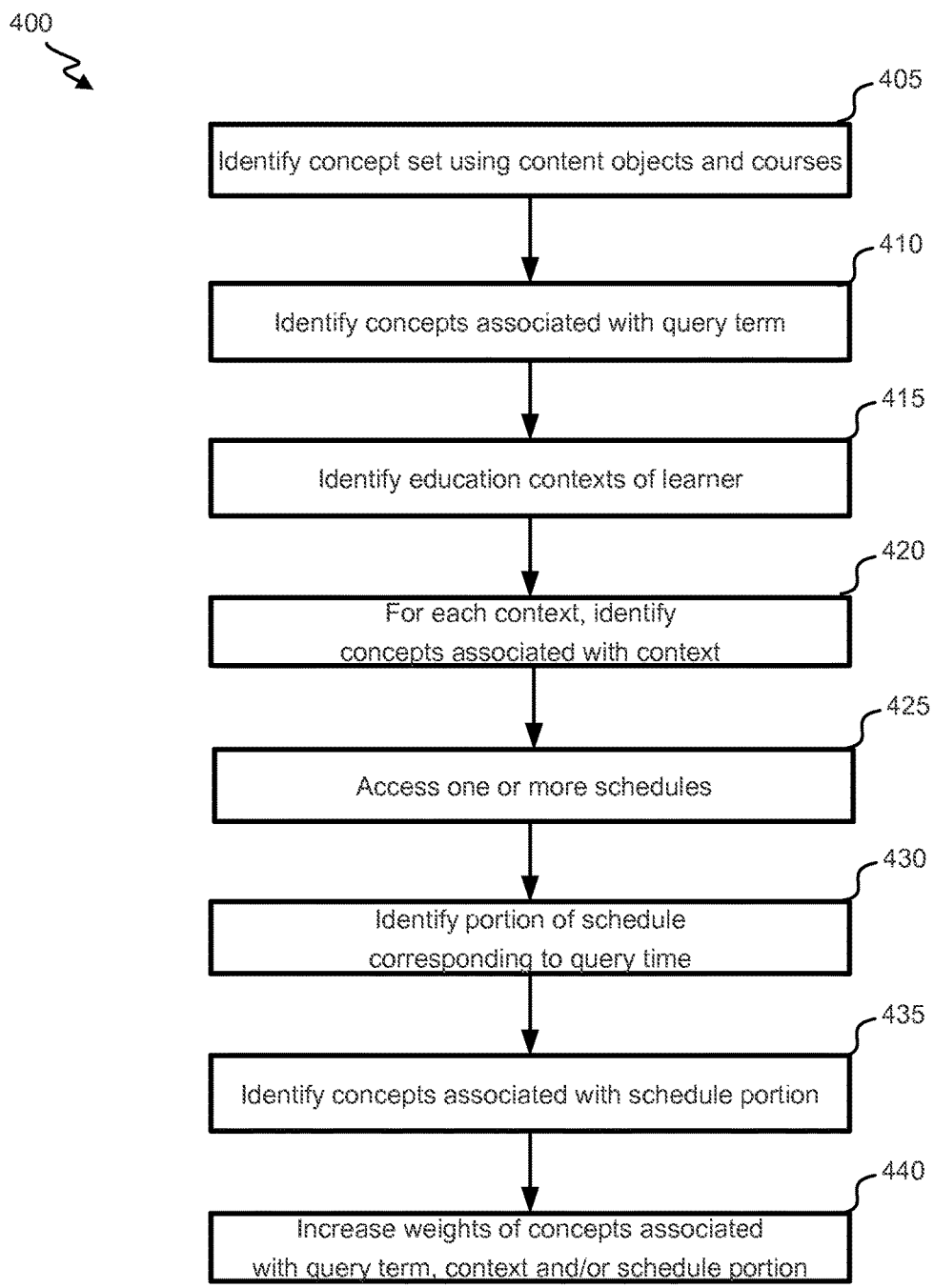
FIG. 4 illustrates a flowchart of an embodiment of a process for using educational context information and a query time to identify relevant content objects responsive to a query.

FIG. 4 illustrates a flowchart of an embodiment of a process 400 for using educational context information and a query time to identify relevant content objects responsive to a query. Process 400 illustrates how analysis of each of query terms, contexts and query times can identify which concepts are relevant for a query. In some instances, process 400 represents an embodiment of blocks 315-330 in process 300.

Process 400 begins at block 405, where concept term mapper 225 identifies a concept set. Each concept in the concept set can, e.g., represent a topic or subject. The concept can be defined, e.g., by a title (e.g., "GPS algorithm") and one or more other terms (e.g., receiver, transmitter, satellite, location, coordinates, position, global positioning system, frame, etc.). In some instances, each other term is associated with a numeric pertinence factor of how related the term is to the concept. For example, "global positioning system" may have a strong relationship (and thus, a high pertinence factor) for the "GPS algorithm" concept, while "frame" may not.

Concepts can be identified for inclusion in the concept set and definitions of each concept can be determined based on, e.g., content objects and courses. For example, concept term mapper 225 can determine how frequently various terms (or their roots) appear in content objects and/or context definitions (and/or schedules). When the occurrence frequency exceeds a threshold, it can be defined as a concept. Concept term mapper 225 can further use co-occurrence metrics and/or term-separation analyses to identify relationships between terms, which can be used to identify other terms related to a concept. In some instances, a person (e.g., a content provider 105, educational context definer 125 or operator of system 150) can identify one or more concepts and their definitions.

Concept term mapper 225 can identify one or more concepts that are associated with a query term at block 410. For example, concept term mapper 225 can scan concepts' titles and definitions in search for the query term (or a root of the query term). In some instances, as mentioned above, terms in a concept's definition are associated with a pertinence factor. Thus, rather than relying on a binary indication as to whether a query term is related to a concept, this pertinence factor can be used in a determination about how relevant content items for the concept are for the query.

In some instances, a query includes multiple query terms. Concept term mapper 225 can then perform block 410 separately for each term or collectively. A collective analysis can include, e.g., an "AND" operation, where a concept is required to relate to each query term to be associated with a query, or an "OR" operation. Determinations about how relevant content items are for a concept can then depend on pertinence factors for each query-matching term in the concept's definition.

At block 415, context engine 230 identifies one or more contexts (e.g., courses, instructor, grade level) for the learner. Embodiments of block 415 can parallel embodiments described in relation to block 320 of process 300. For example, contexts can be identified using information from an account of the learner.

At block 420, context engine 230 identifies one or more concepts associated with the context(s). When multiple contexts are identified at block 415, the contexts can again be evaluated in an "AND" technique (e.g., requiring that a concept relate to each context to be identified) or an "OR" technique.

The concepts can be identified as described herein (e.g., as described with reference to block 320 in process 300). For example, a definition for a context can be manually and/or automatically generated (e.g., based on text describing the context or in referenced text). The definition can include one or more concepts. A context-correspondence variable that is indicative of a degree to which the concept is relevant for the context can be determined for each identified concept. This variable can also be included in the definition of the context.

At block 425, schedule engine 240 accesses one or more schedules for a learner. Each schedule can be associated with one or more contexts of the contexts identified at block 415. The schedule can include, e.g., a syllabus, an exam schedule, an assignment schedule, an event schedule (e.g., for meets, matches or games), a meeting schedule, or a holiday schedule (e.g., indicating when school is in session). The schedule can include absolute or relative time points (which can include time periods). For example, a schedule can include a relative time period of "Week 1: Force" or an absolute time period of "12/1, 12/3 and 12/5: Entropy".

At block 430, schedule engine 240 identified a portion of each schedule that corresponds to a time of a query (e.g., a time that a query was entered by a learner or received by a processor). The portion can be identified using a technique, such as one described in relation to block 325 of process 300. For example, a query time can be mapped to a point in the schedule, and the portion can include a portion of the schedule at the mapped point, before the mapped point or after the mapped point. To illustrate, a schedule can indicate that a course begins on 1/10/13, and can identify topics for each week. A query time of 1/25/13 can then be mapped to Week 3. A portion can then include, e.g., a time window around this time (e.g., Weeks 2-4), a time window preceding this time (e.g., Weeks 1-3) or the precise time (e.g., Week 3). As described above, a filter can be associated with the portion, e.g., such that various parts of the schedule can be of differential influence.

At block 435, schedule engine 240 identifies one or more concepts associated with the schedule portion (or schedule portions, if multiple schedules are accessed at block 425). The concepts can be determined e.g., based on text in the schedule. For example, if a portion includes Week 3, and the schedule includes: "Week 3: Dinosaurs", schedule engine 240 can search concepts' definitions and titles for "Dinosaurs". The concepts can also or alternatively be determined based on cited text. For example, if a portion includes Week 3, and a schedule indicates that pages 157-183 of Book A are assigned for the week's lecture, schedule engine 240 can identify terms in titles, headings or text in the pages and scan concepts' definitions and titles for the terms. As described above, a schedule-correspondence variable can be determined for each of one, more or all concept.

Query engine 220 assigns or modifies a weight to each of one or more concepts at block 440. A higher weight for a concept can correspond to a query term, a context or a query-time-portion of a schedule mapping to the concept. A weight can (in some instances) not only reflect an occurrence of such mapping but can also represent a strength of the mapping. The weight can be based on a term-correspondence variable, a context-correspondence variable and/or a schedule-correspondence variable for that concept. In instances where multiple terms, contexts or schedules apply to a query, multiple respective correspondence variables can be used to determine the weight.

In one instance, a hierarchy exists between term analysis, context analysis and schedule analysis. This hierarchy can indicate (e.g.,) that a context-related concept is not to be associated with a high weight if it is not related to a query term (or the converse). This hierarchy can be accomplished, e.g., based on one or more selections of concept subsets. For example, a first subset of concepts can be selected to include all concepts with a term-correspondence variable above a threshold. A context-correspondence variable can then be determined for each of those concepts. A second threshold-based subset selection can be performed and a schedule-correspondence variable can then be determined for each remaining concept. A weight can depend then only on this last correspondence variable (e.g., since the other correspondence variable already influenced subset selection) or can depend on multiple correspondence variables.

Figure 5:
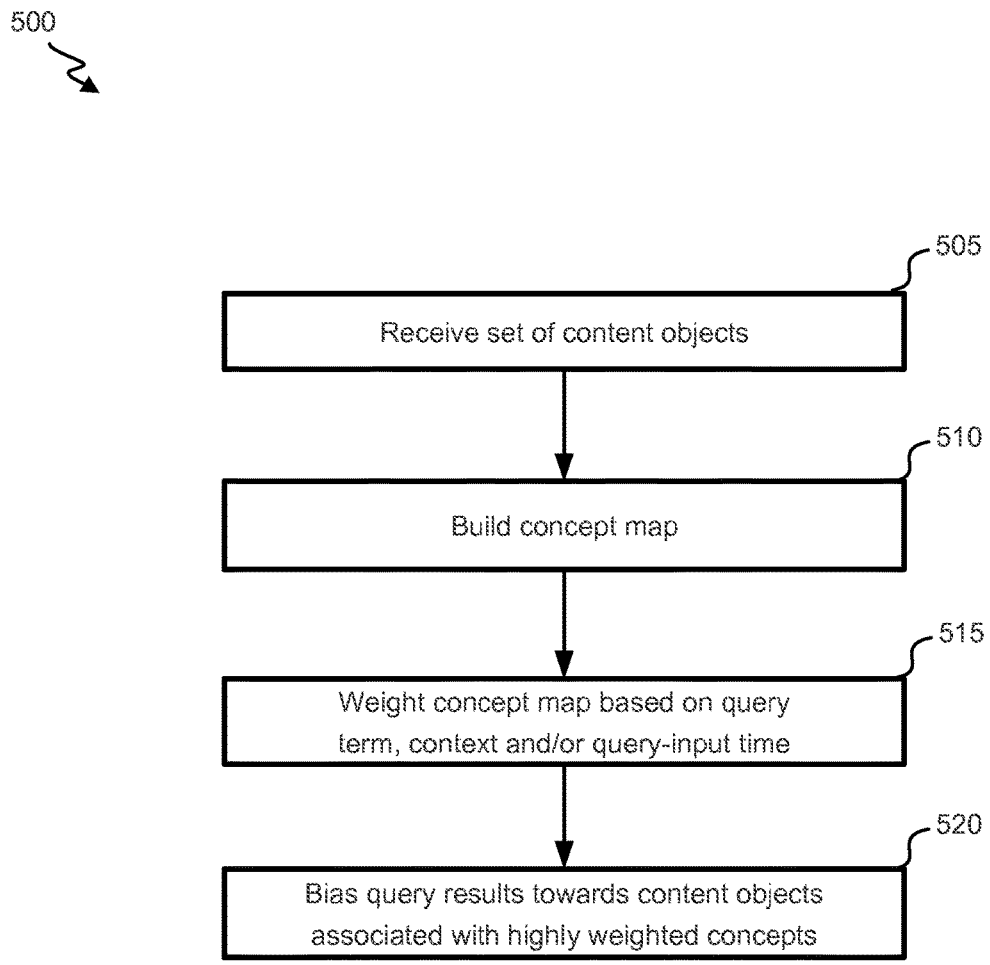
FIG. 5 illustrates a flowchart of an embodiment of a process for analyzing content objects.

FIG. 5 illustrates a flowchart of an embodiment of a process 500 for analyzing content objects. Process 500 begins at block 505 where content manager 205 receives a set of content objects. The objects can be received simultaneously, in batches or individually. The objects can be received from one or more content providers 105.

The content objects can include documents (e.g., articles, worksheets, or tutorials), presentations webpages and/or media files (e.g., videos, graphics or audio files). The content objects can be static or interactive, such that information presentations change based on a learner's input. In some instances, one or more content objects can include a content object (e.g., a text book) referenced by a context definition or schedule.

Content manager 205 builds a concept map based on the content objects at block 510. The concept map can be built by associating individual content objects with one or more concepts and determining which concepts are likely to co-occur. These co-occurring concepts can be connected on the concept map. In some instances, the connections are weighted such that concepts more likely to co-occur are assigned a higher weight.

The association of individual content objects with one or more concepts can be performed based on automatic analysis of the content object and/or received input. For example, one or more terms can be extracted (e.g., any term matching a term set included in concepts' titles or definitions) from a content object's title, keywords, description or text. Concepts associated with the terms can then be identified. A weight for a concept can depend on whether a concept-defining term matched an extracted term and (if so) where the term was extracted from, a frequency of observing the term, and/or a number of concept-defining terms matching extracted terms. For example, a weight for a "baseball" concept (with a definition including a "game" term) can be high for a book based on each of the following features: the book is entitled "Baseball" (weight contributor for concept name included in object's title) with chapter 1 being "History of the game" (weight contributor for section heading with definition term), and "baseball" representing 452 words in a 7,329-word object (weight contributor for high concept-name word ratio).

In one instance, one or more concepts are identified and/or weighted using a semantic map. For example, when a content object includes many terms for categories (e.g., football, basketball and baseball) falling within a concept (e.g., sports), it may be associated with the concept. Thus, a map, table, or other association structure can be used to identify features of content objects (e.g., terms or term co-occurrences,) that correspond to a given concept, and content objects having those features can be associated with the concept (e.g., and weighted based on a prevalence of the features).

As another example, a set of available concepts can be identified to a content provider 105 before or after a content object is received (e.g., uploaded). Content provider 105 can then select one or more concepts (e.g., and can identify a weight for each of the selected concepts). Thus, for example, for a webpage, a content provider 105 can indicate that it strongly relates to "French" (e.g., weight=1.0) and moderately relates to "foreign language", "Europe", and "France" (weight of 0.5).

At block 515, concepts in the concept map can be weighted (or weights of the map can be adjusted) based on a query term, a context and/or when a query was entered relative to a schedule. For example, a query term, context and/or query time can itself be associated with one or more concepts. Each of these "primary" concepts can be assigned a high weight. Other "secondary" concepts connected (directly or indirectly) to a primary concept can be assigned a weight that depends on one or more connection strengths between the primary concept and the secondary concept (e.g., a minimum strength, an average strength, or a median strength) and/or a number of connections separating the secondary concept from a primary concept. In some instances, a content map is shrunk to only include concepts that are within a fixed number of connections from a primary connection and/or being separated from a primary concept via connections of at least a threshold strength.

At block 520, query engine 220 can bias query results towards content objects associated with highly weighted concepts. For example, query results can be focused on or restricted to those with a concept that is connected to a query-related concept with fewer than a threshold number of connections or with a connection strength above a threshold connection strength.

In one instance, only a subset of content objects are identified in a query result, and the weighted concept map influences which content objects are represented. For example, a rule can indicate that only 100 content objects are to be identified in a query result, such that only content objects associated with concepts having the 100 highest connection strengths are identified.

In one instance, each of the content object and the query (or a term of the query) can include weights for each of one or more concepts. A relevance metric can then depend on a degree to which these weights match or are correlated. In one instance, a primary concept is determined for the query, and the relevance metric is determined based on the content object's weight for that concept. In one instance, a primary concept is determined for the content object, and the relevance metric is determined based on the query's (or query term's) weight for that concept. In one instance, the relevance metric depends on a dot-product or correlation between corresponding weights for a set of concepts for the query (or query term) and the content object. Thus, generally, a relevance metric can be high when a content object and query are estimated to be focused on one or more similar concepts. Query results can then be biased towards content objects with high relevance metrics.

In one instance, a result prominence or order depends on the weighted concept map and/or relevance metrics. For example, content objects can be identified in an order based on relevance metrics (e.g., such that a content object with a highest relevance metric is identified at a top off a result list). As another example, representations of content objects with high (e.g., above-threshold) relevance metrics can be highlighted, bordered, bolded, or colored to emphasize the result.

Thus, each content object can be initially processed and mapped to various concepts. These concepts can be related to each other via a concept map. Queries can be similarly processed (e.g., based on a term of a query, a learner's context and a query time). Content items with concept-matching corresponding to that for queries can then be preferentially returned to learners. Further, content items with additional or alternative concepts connected to query concepts in a query map can be returned. For example, if content object A was associated with query-related concept M and concept N that is connected in a concept map, it may be returned before returning content object B that is only associated with query-related concept M. As another example, only two content objects are associated with query-related concept M, then additional results can focus on those associated with concept N that is connected to concept M in the concept map. Using this technique, results relevant to a learner's query objectives can be identified.

Disclosures herein frequently focus on educational embodiments. For example, contexts are frequently disclosed as including course contexts and examples of schedules usually including syllabi. It will be appreciated, however, that embodiments of the present inventions can extend beyond the educational realm. Techniques described herein can be applied to a variety of contexts (e.g., including non-educational contexts, such as professional contexts, client contexts, or task contexts) and schedules (e.g., including professional deadlines, client deadlines, government deadlines or task deadlines).

Thus, for example, a context can indicate which projects an employee is working on, and one or more schedules can identify a timeline and/or deadline for each project. Query processing may then be tailored to bias towards results pertaining to the project and/or topics relevant given where a query time falls within the schedule. As another example, a context can identify which apps are loaded on a user device, and a schedule can identify events on an electronic calendar of the user. Query processing may then be tailored to bias towards results pertaining to subjects of the apps and/or topics relevant to calendar events corresponding to a query time. As yet another example, a context can identify product searches or purchases made by a user, and a schedule can identify holiday and/or important personal events (e.g., birthdays or anniversaries). Query processing may then be tailored to bias towards results pertaining to product types previously purchased and/or products related to an event (and/or person associated with an event) corresponding to a query time.

Figure 6:
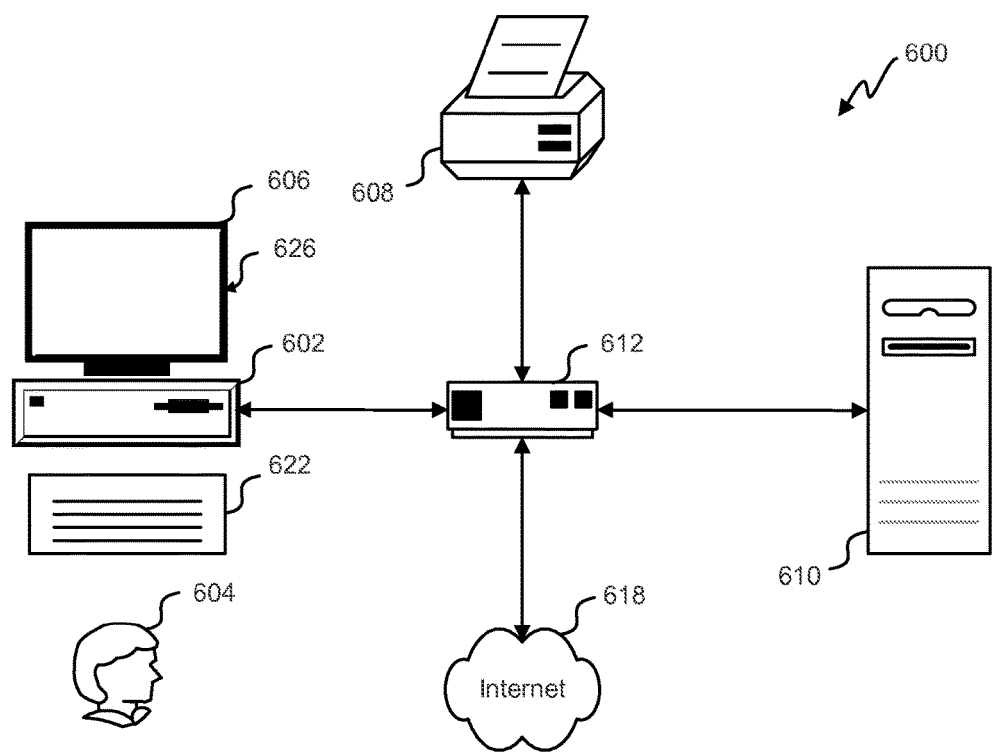
FIG. 6 depicts a block diagram of an embodiment of a computer system.

Referring next to FIG. 6, an exemplary environment with which embodiments can be implemented is shown with a computer system 600 that can be used by a designer 604 to design, for example, electronic designs. The computer system 600 can include a computer 602, keyboard 622, a network router 612, a printer 608, and a monitor 606. The monitor 606, processor 602 and keyboard 622 are part of a computer system 626, which can be a laptop computer, desktop computer, handheld computer, mainframe computer, etc. Monitor 606 can be a CRT, flat screen, etc.

A designer 604 can input commands into computer 602 using various input devices, such as a mouse, keyboard 622, track ball, touch screen, etc. If the computer system 600 comprises a mainframe, a designer 604 can access computer 602 using, for example, a terminal or terminal interface. Additionally, computer system 626 can be connected to a printer 608 and a server 610 using a network router 612, which can connect to the Internet 618 or a WAN.

Server 610 can, for example, be used to store additional software programs and data. In one embodiment, software implementing the systems and methods described herein can be stored on a storage medium in server 610. Thus, the software can be run from the storage medium in server 610. In another embodiment, software implementing the systems and methods described herein can be stored on a storage medium in computer 602. Thus, the software can be run from the storage medium in computer system 626. Therefore, in this embodiment, the software can be used whether or not computer 602 is connected to network router 612. Printer 608 can be connected directly to computer 602, in which case, computer system 626 can print whether or not it is connected to network router 612.

Figure 7:
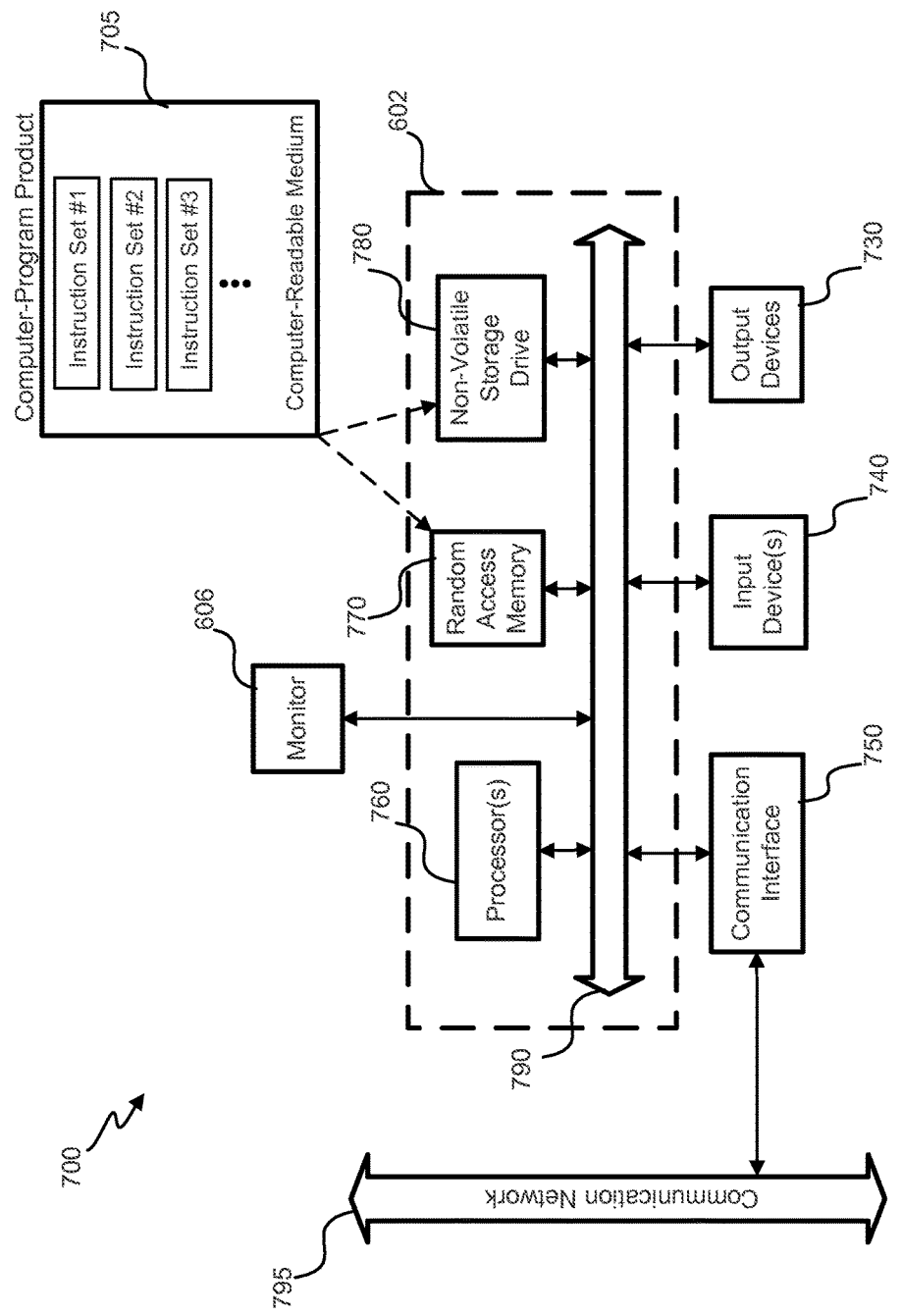
FIG. 7 depicts a block diagram of an embodiment of a special-purpose computer system.

With reference to FIG. 7, an embodiment of a special-purpose computer system 700 is shown. Context-sensitive querying system 150 and/or any components thereof are examples of a special-purpose computer system 700. Thus, for example, one or more special-purpose computer systems 700 can be used to provide the function of context-sensitive query system 150. The above methods can be implemented by computer-program products that direct a computer system to perform the actions of the above-described methods and components. Each such computer-program product can comprise sets of instructions (codes) embodied on a computer-readable medium that directs the processor of a computer system to perform corresponding actions. The instructions can be configured to run in sequential order, or in parallel (such as under different processing threads), or in a combination thereof. After loading the computer-program products on a general purpose computer system 626, it is transformed into the special-purpose computer system 700.

Special-purpose computer system 700 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program product 705 stored in a tangible computer-readable memory in computer 602. Computer-program product 705 directs system 700 to perform the above-described methods. Computer 602 can include one or more processors 760 that communicate with a number of peripheral devices via a bus subsystem 790. These peripheral devices can include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program product 705 can be stored in non-volatile storage drive 790 or another computer-readable medium accessible to computer 602 and loaded into memory 770. Each processor 760 can comprise a microprocessor, such as a microprocessor from Intel® or Advanced Micro Devices, Inc®, or the like. To support computer-program product 705, the computer 602 runs an operating system that handles the communications of product 705 with the above-noted components, as well as the communications between the above-noted components in support of the computer-program product 705. Exemplary operating systems include Windows® or the like from Microsoft Corporation, Solaris® from Sun Microsystems, LINUX, UNIX, and the like.

User input devices 740 include all possible types of devices and mechanisms to input information to computer system 602. These can include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These can include a display (e.g., monitor 606), printers, non-visual displays such as audio output devices, etc.

Communications interface 750 provides an interface to other communication networks and devices and can serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 can be coupled to a computer network, to a FireWire® bus, or the like. In other embodiments, communications interface 750 can be physically integrated on the motherboard of computer 602, and/or can be a software program, or the like.

RAM 770 and non-volatile storage drive 780 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 can be configured to store the basic programming and data constructs that provide the functionality of various embodiments of the present invention, as described above.

Software instruction sets that provide the functionality of the present invention can be stored in RAM 770 and non-volatile storage drive 780. These instruction sets or code can be executed by processor(s) 760. RAM 770 and non-volatile storage drive 780 can also provide a repository to store data and data structures used in accordance with the present invention. RAM 770 and non-volatile storage drive 780 can include a number of memories including a main random access memory (RAM) to store of instructions and data during program execution and a read-only memory (ROM) in which fixed instructions are stored. RAM 770 and non-volatile storage drive 780 can include a file storage subsystem providing persistent (non-volatile) storage of program and/or data files. RAM 770 and non-volatile storage drive 780 can also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem can utilize multiple busses or communication paths within computer 602.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for using educational contexts for learners to adjust processing of search queries in a learner-specific manner, the method comprising:

accessing an educational-context data store that identifies, for each learner of a set of learners, a course in which the learner is enrolled, the course being associated with a syllabus;

receiving a search query entered by a learner of the set of learners via an interface, the search query including a query term;

identifying one or more other learners in the set of learners, wherein course data indicates that each learner of the one or more other learners is enrolled in the course;

identifying context data for the course based on one or more query inputs received from the one or more other learners, the context data specified by one or more electronic context definitions generated using context-describing text or reference text, the one or more electronic context definitions, each electronic context definition specifying:

a respective set of one or more electronic concept definitions along with one or more respective context-correspondence variables, each electronic concept definition of the one or more electronic concept definitions specifying one or more respective terms, and each context-correspondence variable of the one or more respective context-correspondence variables identifying a degree to which a respective concept definition of the one or more electronic concept definitions is relevant for the respective electronic context definition;

where each of the one or more electronic concept definitions is mapped to at least one of the one or more query inputs previously entered by the one or more other learners via one or more of a set of learner devices;

determining, for each electronic concept definition of the one or more electronic concept definitions, a respective weight for the electronic concept definition as a function of the query term, a respective term-correspondence variable quantifying a respective relationship factor for the query term in the electronic concept definition, at least some of the context data, and at least one of the one or more respective context-correspondence variables;

accessing content-object data that associates, for each electronic content object of a set of electronic content objects, the electronic content object with one or more definitions of one or more content-object concepts, where each electronic content object is stored in a content data store as an electronic file and/or a content object that is accessible via a set of one or more interfaces with the set of learner devices;

determining, for each electronic content object of the set of electronic content objects, a respective relevance metric, for each electronic concept definition of the one or more electronic concept definitions as a function of:
the respective weight for the electronic concept definition; and
whether or a degree to which the electronic content object is associated with at least one of the one or more definitions of the one or more content-object concepts corresponding to the electronic concept definition;

identifying a subset of the set of electronic content objects, each electronic content object in the subset having a respective relevance metric that exceeds a threshold; and generating a query result that identifies the subset of the set of electronic content objects as being responsive to the search query.

2. The method for using educational contexts for learners to adjust processing of search queries in the learner-specific manner as recited in claim 1, wherein the one or more query inputs includes one or more terms in a second search query entered by the one or more other learners.

3. The method for using educational contexts for learners to adjust processing of search queries in the learner-specific manner as recited in claim 1, wherein the one or more query inputs includes a selection corresponding to a request to view an identified content object.

4. The method for using educational contexts for learners to adjust processing of search queries in the learner-specific manner as recited in claim 1, wherein the one or more query inputs includes a response to a query result presented to the one or more other learners.

5. The method for using educational contexts for learners to adjust processing of search queries in the learner-specific manner as recited in claim 1, further comprising:
searching the educational-context data store to identify the syllabus associated with the course in which the learner is enrolled in,
wherein the respective weight for the electronic concept definition is further based on the syllabus.

6. The method for using educational contexts for learners to adjust processing of search queries in the learner-specific manner as recited in claim 1, further comprising:
determining, for each electronic content object in the set of electronic content objects, a respective content-object weight for the electronic concept definition; and
determining, for each electronic content object in the set of electronic content objects, a relevance metric based on the respective content-object weight and the respective weight for the electronic concept definition,
wherein the electronic content object is identified based on the relevance metrics.

7. The method for using educational contexts for learners to adjust processing of search queries in the learner-specific manner as recited in claim 1, the method further comprising:
determining an order for a plurality of electronic content objects in the set of electronic content objects based on the respective weight for the electronic concept definition, the plurality of electronic content objects including the electronic content object,
wherein the query result identifies at least some of the plurality of electronic content objects in the determined order.

8. The method for using educational contexts for learners to adjust processing of search queries in the learner-specific manner as recited in claim 1, the method further comprising:
accessing part or all of a syllabus-identified content object referenced by a portion of the syllabus; and
identifying the one or more concepts associated with the part or all of the syllabus-identified content object,
wherein the respective weight for the electronic concept definition is determined based on the identification of the one or more concepts.

9. A system for using educational contexts for learners to adjust processing of search queries in a learner-specific manner, the system comprising:
one or more processors;
a context engine that accesses an educational-context data store that identifies, for each learner of a set of learners, a course in which the learner is enrolled, the course being associated with a syllabus;
a query engine that, using the one or more processors:
receives a search query entered by a learner of the set of learners via an interface at an input time, the search query including a query term;
identifies one or more other learners in the set of learners, wherein course data indicates that each learner of the one or more other learners is enrolled in the course;
identifies context data for the course based on one or more query inputs received from the one or more other learners, the context data specified by one or more electronic context definitions generated using context-describing text or reference text, the one or more electronic context definitions, each electronic context definition specifying:
a respective set of one or more electronic concept definitions along with one or more respective context-correspondence variables, each electronic concept definition of the one or more electronic concept definitions specifying one or more respective terms, and each context-correspondence variable of the one or more respective context-correspondence variables identifying a degree to which a respective concept definition of the one or more electronic concept definitions is relevant for the respective electronic context definition;
where each of the one or more electronic concept definitions is mapped to at least one of the one or more query inputs previously entered by the one or more other learners via one or more of a set of learner devices;
determines, for each electronic concept definition of the one or more electronic concept definitions, a respective weight for the electronic concept definition as a function of the query term, a respective term-correspondence variable quantifying a respective relationship factor for the query term in the electronic concept definition, at least some of the context data, and at least one of the one or more respective context-correspondence variables;
accesses content-object data that associates, for each electronic content object of a set of electronic content objects, the electronic content object with one or more definitions of one or more content-object concepts, where each electronic content object is stored in a content data store as an electronic file and/or a content object that is accessible via a set of one or more interfaces with the set of learner devices;

determines, for each electronic content object of the set of electronic content objects, a respective relevance metric, for each electronic concept definition of the one or more electronic concept definitions as a function of:

the respective weight for the electronic concept definition; and whether or a degree to which the electronic content object is associated with at least one of the one or more definitions of the one or more content-object concepts corresponding to the electronic concept definition;

identifies a subset of the set of electronic content objects, each electronic content object in the subset having a respective relevance metric that exceeds a threshold; and determines a query result that identifies the subset of the set of electronic content objects as being responsive to the search query.

10. The system for using educational contexts for learners to adjust processing of search queries in the learner-specific manner as recited in claim 9, wherein the one or more query inputs includes one or more terms in a second search query entered by the one or more other learners.

11. The system for using educational contexts for learners to adjust processing of search queries in the learner-specific manner as recited in claim 9, wherein the one or more query inputs includes a selection corresponding to a request to view an identified content object.

12. The system for using educational contexts for learners to adjust processing of search queries in the learner-specific manner as recited in claim 9, wherein the one or more query inputs includes a response to a query result presented to the one or more other learners.

13. The system for using educational contexts for learners to adjust processing of search queries in the learner-specific manner as recited in claim 9, wherein the query engine further:

searching the educational-context data store to identify the syllabus associated with the course in which the learner is enrolled, wherein the respective weight for the electronic concept definition is further based on the syllabus.

14. The system for using educational contexts for learners to adjust processing of search queries in the learner-specific manner as recited in claim 9, further comprising:

a content manager that:

determines, for each electronic content object in the set of electronic content objects, a content-object weight for the electronic concept definition; and determines, for each electronic content object in the set of electronic content objects, a relevance metric based on the content-object weight and the respective weight for the electronic concept definition, wherein the electronic content object is identified based on the relevance metrics.

15. The system for using educational contexts for learners to adjust processing of search queries in the learner-specific manner as recited in claim 9, wherein the query engine further determines an order for plurality of electronic content objects in the set of electronic content objects based on the respective weight for the electronic concept definition, the plurality of electronic content objects including the electronic content object, wherein the query result identifies at least some of the plurality of electronic content objects in the determined order.

16. The system for using educational contexts for learners to adjust processing of search queries in the learner-specific manner as recited in claim 9, further comprising a schedule engine that:

accesses part or all of a syllabus-identified content object referenced by a portion of the syllabus; and identifies the one or more concepts associated with the part or all of the syllabus-identified content object, wherein the respective weight for the electronic concept definition is determined based on the identification of the one or more concepts.

17. A computer-program product tangibly embodied in a non-transitory machine-readable storage medium, including instructions configured to cause one or more data processors to:

access an educational-context data store that identifies, for each learner of a set of learners, a course in which the learner is enrolled, the course being associated with a syllabus;

receive a search query entered by a learner of the set of learners via an interface, the search query including a query term;

identify one or more other learners in the set of learners, wherein course data indicates that each learner of the one or more other learners is enrolled in the course;

identify context data for the course based on one or more query inputs received from the one or more other learners, the context data specified by one or more electronic context definitions generated using context-describing text or reference text, the one or more electronic context definitions, each electronic context definition specifying:

a respective set of one or more electronic concept definitions along with one or more respective context-correspondence variables, each electronic concept definition of the one or more electronic concept definitions specifying one or more respective terms, and each context-correspondence variable of the one or more respective context-correspondence variables identifying a degree to which a respective concept definition of the one or more electronic concept definitions is relevant for the respective electronic context definition;

where each of the one or more electronic concept definitions is mapped to at least one of the one or more query inputs previously entered by the one or more other learners via one or more of a set of learner devices;

determine, for each electronic concept definition of the one or more electronic concept definitions, a respective weight for the electronic concept definition as a function of the query term, a respective term-correspondence variable quantifying a respective relationship factor for the query term in the electronic concept definition, at least some of the context data, and at least one of the one or more respective context-correspondence variables;

access content-object data that associates, for each electronic content object of a set of electronic content objects, the electronic content object with one or more definitions of one or more content-object concepts, where each electronic content object is stored in a content data store as an electronic file and/or a content object that is accessible via a set of one or more interfaces with the set of learner devices;

determine, for each electronic content object of the set of electronic content objects, a respective relevance metric, for each electronic concept definition of the one or more electronic concept definitions as a function of:
- the respective weight for the electronic concept definition; and
- whether or a degree to which the electronic content object is associated with at least one of the one or more definitions of the one or more content-object concepts corresponding to the electronic concept definition;

identify a subset of the set of electronic content objects, each electronic content object in the subset having a respective relevance metric that exceeds a threshold; and generate a query result that identifies the subset of the set of electronic content objects as being responsive to the search query.

18. The computer-program product as recited in claim 17, wherein the one or more query inputs includes one or more terms in a second search query entered by the one or more other learners, a selection corresponding to a request to view an identified content object, or a response to a query result presented to the one or more other learners.

* * * * *